Dec. 22, 1936.　　　　　J. F. KIDD　　　　2,065,376
APPARATUS FOR CRACKING NUTS
Filed Sept. 15, 1934　　　5 Sheets-Sheet 1

Fig. 1
Fig. 6
Fig. 7

Inventor
Jerome F. Kidd
Strauch & Hoffman
Attorneys

Dec. 22, 1936.   J. F. KIDD   2,065,376
APPARATUS FOR CRACKING NUTS
Filed Sept. 15, 1934   5 Sheets-Sheet 4

Inventor
Jerome F. Kidd

By Strauch & Hoffman
Attorney

Dec. 22, 1936.                    J. F. KIDD                    2,065,376
                           APPARATUS FOR CRACKING NUTS
                             Filed Sept. 15, 1934          5 Sheets-Sheet 5

Inventor
Jerome F. Kidd
By Strauch & Hoffman
Attorneys

Patented Dec. 22, 1936

2,065,376

UNITED STATES PATENT OFFICE 2,065,376

APPARATUS FOR CRACKING NUTS

Jerome F. Kidd, East St. Louis, Ill., assignor to U. N. C. Corporation, East St. Louis, Ill., a corporation of Illinois Application September 15, 1934, Serial No. 744,233

13 Claims. (Cl. 146—12)

The present invention relates to nut cracking devices and more particularly to such devices as employed in cracking relatively large quantities of nuts as in the commercial production of nut meats, nut butters and like products.

More specifically the present invention relates in part to nut cracking machines of the type employing a rotating disk having pick up members and cracking plungers carried thereon whereby the nut to be cracked is picked up by the former and cracked by the plungers. Machines of this general type have been previously employed, but have been regarded as disadvantageous in that they have utilized somewhat complex drive systems susceptible to maladjustment and difficult to repair in event of breakage. Moreover, no provision has been made for an automatic adjustment of the breaking stroke in accordance with the size of the individual nuts being broken and which, as is common knowledge, may vary over wide limits. As a result, manual adjustment must be relied upon to adjust the machines to nuts of different sizes or else some nuts will be unduly crushed and the meats commercially ruined while others may be insufficiently cracked. Moreover, such adjustments must also be made for nuts of different varieties, the shells of which have different characters of resistance. For instance, the shells of some nuts yield very little under pressure and only a slight deformation effects cracking while other nuts having more flexible shells, must be deformed to a considerable degree before cracking. Such manual adjustment not only requires experience but occupies time during which the machine cannot be operated.

Other disadvantages of the prior machines will become apparent as the description of the present invention proceeds, a primary object of which is to provide a novel nut cracking machine of a commercial type which is highly efficient in operation, extremely sturdy in construction, easy to operate and repair, and of a construction as to permit ready manufacture at a relatively low cost.

A further object of this invention is to provide a nut cracking machine of novel construction which is adaptable to all sizes and species of nuts without the necessity of manual adjustment or the changing of parts. This feature is of relatively great importance since nuts which, for former machines must be graded, need not now be graded and may therefore be purchased at a lower price.

A further object of the present invention resides in the provision of a novel nut cracking machine having all of the rotating parts thereof carried on a common driven shaft supported by a relatively simple frame construction, also providing support for a prime mover and bins or hoppers for the uncracked and cracked nuts.

A further object of the present invention is to provide a novel nut cracking machine with a rotating disk member freely mounted on a single driven shaft and geared thereto through a set of reduction gears whereby the rate of rotation of the disk and the operation of the cracking means is easily and positively synchronized.

Another object of the present invention resides in the provision in a nut cracking machine cup a novel type of rotating disk having a plurality of easily removable pick up fingers thereon whereby repairs, assembly and disassembly operations are rendered relatively simple.

A further object of the present invention resides in the provision in a nut cracking machine of a novel closure gate for a nut supply hopper whereby the entrance of pick up members therein without escape of nuts therefrom is assured.

A still further object of the present invention resides in the provision in a nut cracking machine of novel wire basket receiving pockets which are disposed adjacent pick up elements and are adapted to position the nuts to be cracked in alignment with the cracking members whereby cracking of the nuts in a manner to secure the meats thereof in the most desirable form is assured.

Another object of the present invention resides in the provision in a nut cracking machine of novel gripping and cracking members, which are adapted to be moved into engagement with the nut to be cracked under the action of novel independent gripping and cracking actuators.

A further object of the present invention resides in the provision in a nut cracking machine of the rotating disk type of novel means for centering the nut between movable gripping and cracking members whereby the nut is cracked in a manner best to extract the meats therefrom.

A still further object of the present invention resides in providing a novel nut cracking machine of the rotating disk type with novel cam actuated means adapted to move individual nut gripping members toward each other until the nut is gripped, the cam actuated means thereafter being ineffective to cause further movement of the members until the cracking operation is to be performed.

Another object of the present invention resides in the provision of novel means for locking the cam actuated means after the gripping of the nut and prior to the cracking operation.

A still further object of the present invention resides in the provision in a nut cracking machine of novel means for effecting a synchronized movement of nut cracking elements by driven arms to thereby cause the nut cracking elements to be reciprocated toward one another by means of a quick action thread and to impart a cracking impulse or thrust to the nut gripping elements.

Another object of the present invention resides in the provision of novel nut cracking assemblies with means for automatically determining the length of time that said assemblies are in contact with their actuating means to thereby control the length of the cracking stroke.

A further object of the present invention resides in the provision of means for rendering the cracking mechanism ineffective to impart a cracking motion to the cracking elements should the machine fail to pick up a nut, thus preventing possible damage by the forceful contact of members of a set of cracking elements with no nut therebetween.

Still a further object of this invention is the novel combination of safety means with a nut cracking machine whereby if a stone or like object incapable of being cracked and likely to damage the cracking elements is picked up, the operation of the machine will be halted before an opportunity is afforded for damage.

A further object of the present invention is the provision of a novel nut cracking machine wherein a thrust as contrasted to a hammer blow or stroke is employed for cracking, resulting in a gradual application of pressure, properly and automatically regulated and halted at the right point for each size nut, depending upon the length thereof.

Still a further object of the present invention resides in a novel method of cracking nuts wherein the nuts to be cracked are first placed under a predetermined pressure and subsequently subjected to a thrust or gradually increasing pressure of predetermined magnitude varied in accordance with the size of the individual nut being cracked.

A further object of this invention is to provide a novel nut cracking machine wherein individual nuts are first subjected to a predetermined pressure at desired points of application and are subsequently subjected to thrusts of predetermined magnitude to effect cracking, means being provided whereby the magnitude of the thrust is proportioned to the length of the nut being cracked.

Other objects and advantages will appear from the following detailed description and the appended claims when read in connection with the attached drawings wherein:

Figures 1, 6, 7:
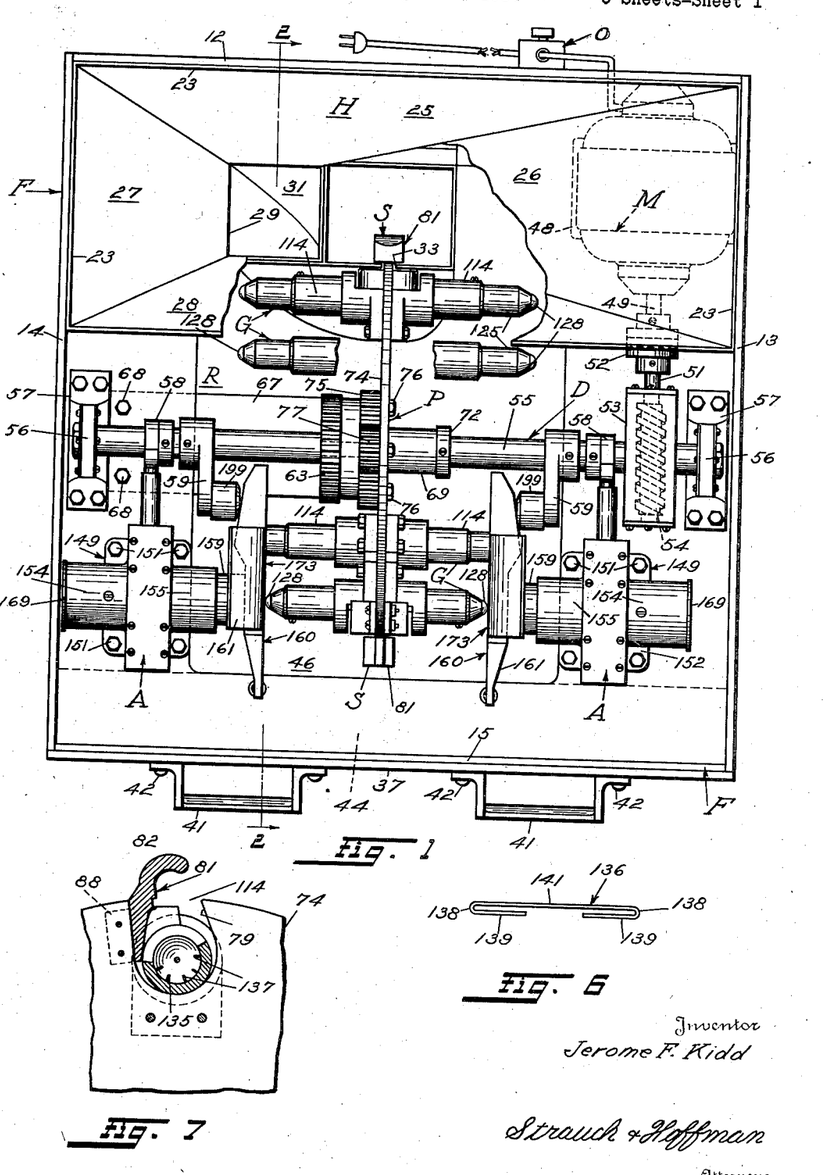
Figure 1 is a plan view of a preferred embodiment of my invention.
Figure 6 is a detail view of a preferred form of wire element used to form the novel nut receiving and positioning basket forming a part of the present invention.
Figure 7 is a sectional view taken substantially on line 7—7 of Figure 3, looking in the direction indicated by the arrows.
Figures 2, 10:
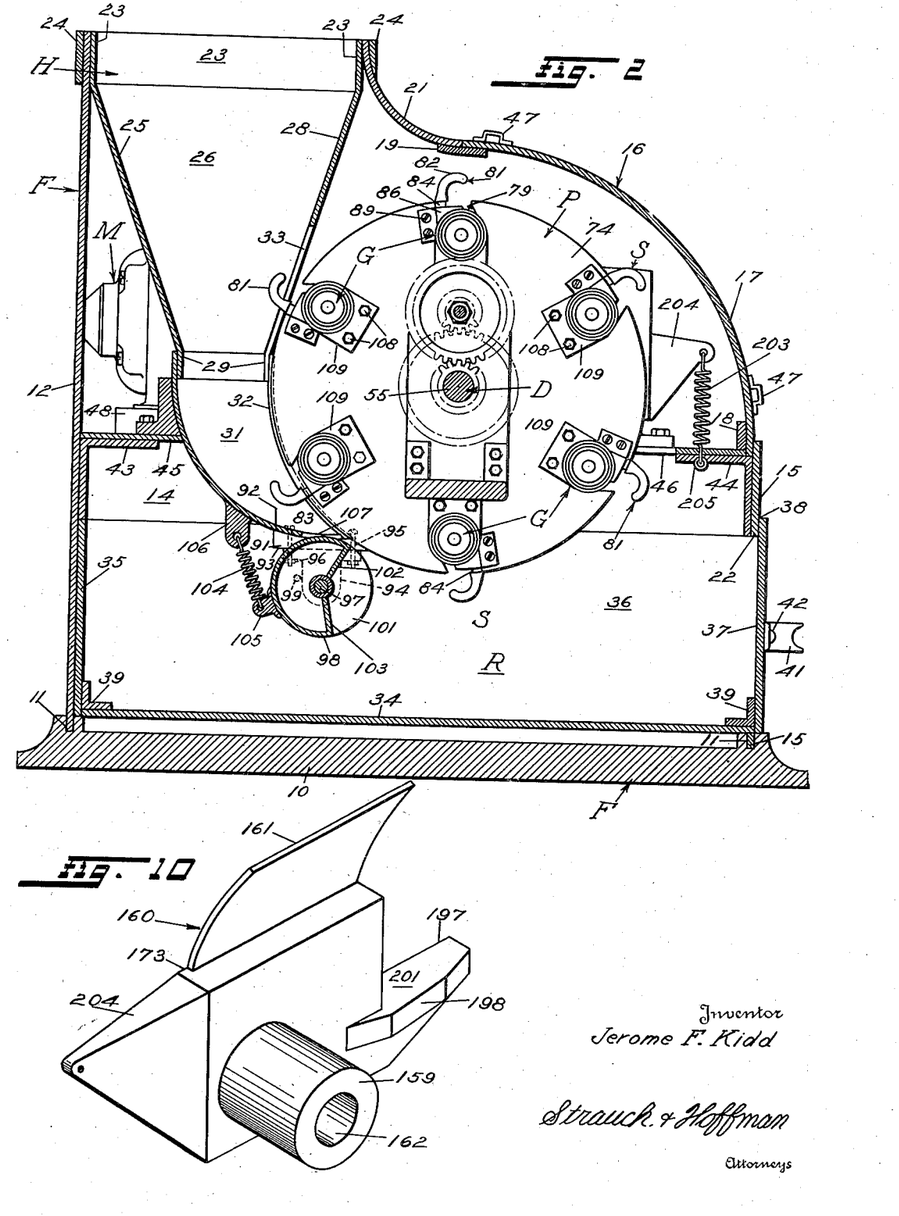
Figure 2 is a transverse sectional view taken substantially along the line 2—2 of Figure 1 looking in the direction of the arrows.
Figure 10 is a perspective view of a preferred form of cam follower which is adapted to cooperate with the nut gripping and cracking mechanism of Figures 8 and 9 to cause its operation.

With continued reference to the drawings wherein like reference characters are utilized throughout the several figures to indicate the same parts and with particular reference to Figures 1 and 2, the preferred embodiment of the present invention as shown comprises a supporting base and frame F, a nut receiving hopper H, an electric motor M, a driving mechanism D, a rotating disk P having pick up fingers S thereon, gripping and cracking assemblies G, actuating means A for operating assemblies G and a hopper R for receiving the cracked nuts.

For a clear understanding of the present invention, a brief description of the operation of the machine will now be given with reference to the above generic reference characters. The hopper H is filled with nuts and the motor M is started. The motor M through the driving mechanism D causes rotation of the pick up disk P in a counter-clockwise direction when viewed from the right of Figure 1. As disk P rotates, fingers S successively enter hopper H, each removing one nut therefrom. As disk P continues to rotate under influence of the motor M the nuts picked up by the fingers S fall by gravity into the gripping and cracking assemblies G where they are automatically positioned in the most advantageous manner for gripping and cracking.

On either side of the disk P an actuator A adapted to cooperate with the assemblies G is positioned. These actuators are positioned in such a manner that after finger S picks up a nut and delivers it to the assemblies G and the disk P is thereafter rotated through approximately 120° the actuators contact the outer ends of the gripping assemblies and advance them into their gripping positions. As soon as the nut is gripped, the advancing movement of the plungers is arrested due to the resistance offered by the nut and further rotation of the disk P with the assemblies G in contact with the actuators is ineffective to grip the nut harder since the actuators A recede until a further definite point in the cycle of operation is reached. When this point is reached, a member secured to the driving mechanism D locks the actuators A against further movement by assemblies G.

A series of second members carried by the driving mechanism D at this time comes into contact with extensions on the actuating assemblies A and rotate the same. A part of the actuator assembly is advanced due to this rotation and causes a quick and positive advance or thrust of the gripping and cracking assemblies G and consequent cracking of the nut shell. After the nut is cracked, the wheel P carries the cracking assemblies out of contact with the actuators and deposits the cracked nut in the receiving hopper R.

In order to safeguard the parts of the machine from undue strain and breakage should a stone or other like particle of foreign matter reach the cracking assemblies, the overload switch O is adapted to break the circuit when the actuators A are subjected to excess resistance due to the presence of such foreign matter. Although an overload switch is disclosed in the preferred embodiment it is contemplated that an overload clutch such as a slipping friction clutch might be disposed anywhere in the driving mechanism to prevent the main driving shaft from causing actuation of the assemblies A when unusual resistance is offered thereto. With the above general description in mind the detailed structure of the parts will now be described.

The base and frame structure F comprises a flat base 10 having grooves 11 cut therein. The grooves 11 are adapted to receive upright side walls 12, 13, 14 and 15. Upright wall 12 is of general rectangular shape and forms a closed back for the frame. The side walls 13 and 14 are substantially identical in shape and are adapted to lie in abutting engagement with the rear wall 12 and front wall 15 at each corner. The upper edges of the walls 13 and 14 are curved as seen in Figure 2 and support a two part cover 16 thereon. Cover 16 in the present preferred embodiment comprises a forward convex member 17 held in place adjacent the upper edge of front wall 15 by cross strip 18 and at its other extremity by a cross member 19 carried by side walls 13 and 14. The cover 16 is completed by a concave member 21 which is secured to cross member 19 and the side walls 13 and 14. If desired, cover 16 may be hinged or otherwise secured for easy removal to permit ready access to the interior of the housing. Likewise, cover 16 may be formed of transparent material whereby the manner of operation of the device may be readily observed.

The front wall 15 is provided with an opening 22 adjacent the bottom thereof for a purpose to be presently described. The structure so far described provides a substantially closed housing and while it is preferable that the parts thereof be made of sheet metal it will be readily appreciated that wood or other suitable material might be used with very few modifications.

The cover 16 stops short of the rear wall 12 and the hopper H is adapted to fit therein. Hopper H comprises upstanding rectangular securing strips 23 which are adapted to be secured to the back wall 12 and side walls 13 and 14. The securing means for the hopper may assume any suitable form such as welding, riveting, bolting or the like. The upper end of concave cover member 21 abuts the outer face of front strip 23 and is held in place thereon by an encircling band 24 which is adapted to surround the walls 12, 13 and 14 adjacent the marginal strip 23.

The hopper H is completed by converging walls 25, 26, 27 and 28 which are preferably integral with the strips 23. The converging walls of the hopper H terminate in a rectangular opening 29 which fits within the top of an elongated relatively narrow chute 31. Chute 31 is completely closed on three sides and is provided on the fourth side with a slotted wall 32 which faces toward the front of the housing. The wall 28 of hopper H is likewise slotted at 33 in alignment with the slot in chute 31 for a purpose that will later appear.

As previously pointed out the front wall 15 is provided with an opening 22. Opening 22 is adapted to receive a rectangular hopper or drawer designated generally by the reference character R. Hopper R in the preferred embodiment comprises a flat sheet metal floor 34, a back wall 35, side walls 36 and a front wall 37 which is adapted to overlap the wall 15 at 38 to prevent escape of dust or the like from the housing during operation of the machine.

The hopper R at the junction of floor 34 and walls 35 and 37 is provided with reinforcing angle bars 39 which run the entire width of the respective joints to provide a strong and serviceable assembly. A set of handles 41 are secured to the front wall 37 by bolts 42 to provide ready means for sliding hopper R in and out of opening 22 in order to remove the cracked nuts deposited therein. If desired antifriction rollers may be inserted between the floor 34 and base 10 to provide a more easily operable structure, although in the present form such means is not shown.

The rear wall 12 and front wall 15 on the inner sides adjacent the top of hopper R are provided with angle bars 43 and 44 respectively. The angle bars are secured to the walls in any suitable manner such as by welding, riveting or the like. The angle bars 43 and 44 are adapted to receive a flat plate 45 which is preferably secured thereto at a plurality of points to thereby provide a strong and rigid assembly. Plate 45 is provided with a central aperture 46 which fits snugly around the rear end of chute 31 and is enlarged along the sides and front to provide ample clearance for the rotating parts of the machine to be hereinafter described.

From the above description, it will be clear that a substantially closed housing is provided that is extremely strong and rigid and that ready access may be had to the interior thereof by merely removing the convex cover member 17 from its support on cross member 19 and from between the wall 15 and cross member 18 at the front.

In order to facilitate the removal of the member 17, the hand grips 47 may be provided as shown.

Motor and driving mechanism

The driving mechanism D and the connections to the motor M will now be described. The present invention aims to provide a nut cracking machine having a self contained power unit. For this purpose an electric motor M is preferably provided and secured to plate 45. The motor M is positioned in the space to the right of the chute 31 as seen in Figure 1. This space is formed by the sloping construction of wall 26 of hopper H. In order to prevent motor vibrations from being imparted to the rotating parts and the frame the motor is preferably mounted on a rubber block 48. The motor is supported as close as possible to the rear wall 12 in order to secure the advantage of the supporting strength of the angle bar 43 and is provided with a drive shaft 49 which is coupled to a driven shaft 51 through a universal 52. Universal 52 is adapted to accommodate the slight misalignments of the shafts 49 and 51 which may be due to irregularities in manufacturing or movements of the motor due to the rubber block mounting. Shaft 51 extends into a gear box 53 and drives a shaft 55 through a worm drive 54.

Figure 3:
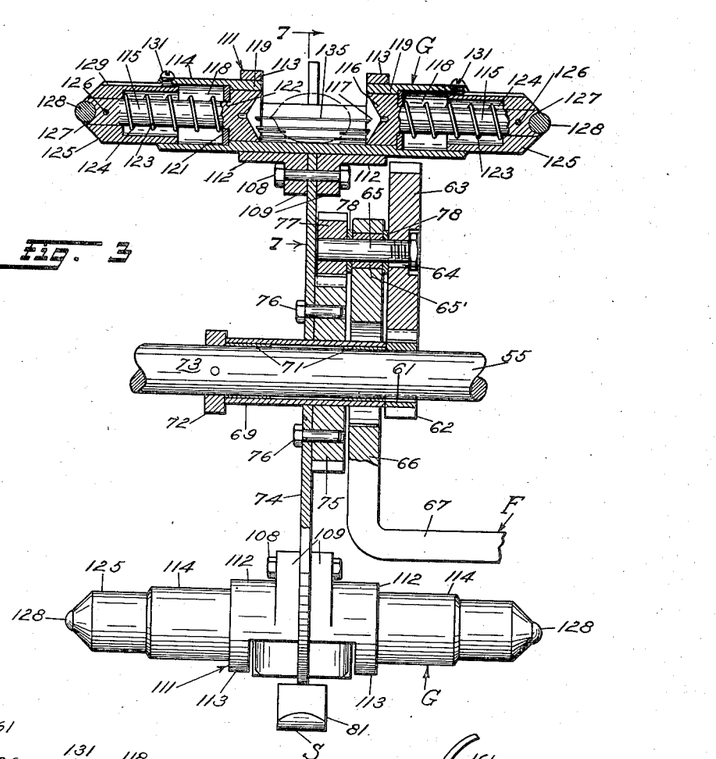
Figure 3 is a vertical sectional view through the preferred form of rotating disk embodied in the present invention showing the detailed assembly of a gripping and cracking plunger and the manner in which the disk is supported on and driven by a driving shaft.

Shaft 55 is supported at its ends by bearing assemblies which are in turn supported on plate 45 by any well known type of pillow block 57 or like support. Shaft 55 inwardly from its ends carries cams 58 and arms 59 non-rotatably secured thereto as by pins 58' and 59' respectively. The purpose of these elements will presently appear. Substantially centrally disposed on shaft 55 and keyed thereto at 61 is a pinion 62 (Figure 3) which is adapted to engage a gear 63 which is keyed at 64 to a counter shaft 65. Shaft 65 is rotatably supported by a bearing 65' carried by an arm 66 which is supported from the under side of plate 45 by means of the offset arm 67 and bolts 68. Arm 66 adjacent shaft 55 is suitably apertured to permit unobstructed rotation of shaft 55.

A short sleeve 69 is rotatably supported on shaft 55 by bearings 71, which may be of any suitable type. One end of sleeve 69 abuts one face of pinion 61 and at the other end abuts a collar 72 secured to shaft 55 as by a pin 73 or the like. The sleeve 69 is adapted to receive a disk 74 to be hereinafter described in detail. Disk 74 has a gear wheel 75 secured thereto as by bolts 76. Gear 75 is adapted to mesh with pinion 77 which is keyed or otherwise secured to countershaft 65 to rotate therewith. Spacers 78 are provided between gears 63 and 77 and the supporting arm 66. From the above description, it will be seen that the disk 74 is rotatably mounted on shaft 55 and is geared thereto by means of pinion 62, gear 63, pinion 77 and gear 75. It will be appreciated from an inspection of the drawings that the above mentioned gear train will cause shaft 55 to drive the disk 74 at a materially reduced speed. In the present preferred embodiment the speed ratio is 6 to 1. The purpose of this gear reduction will appear as the description of the machine and the drive mechanism proceeds with respect to the several figures of the drawings.

Rotating disk and associated parts

Figure 4:
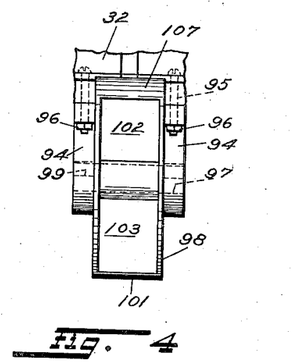
Figure 4 is a fragmental detail view of the storage hopper and the novel closure gate preferably employed in the mechanism shown in Figure 1 to illustrate the manner of cooperation therebetween.
Figure 5:
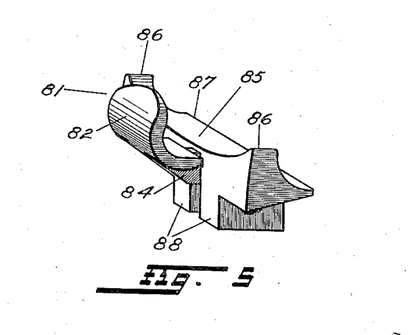
Figure 5 is a perspective view of a preferred form of pick-up finger employed in connection with the disk of Figure 3.

The rotating disk 74 is provided around its periphery with a plurality of notches 79 adapted to receive pick up fingers 81 and gripping assemblies G. Fingers 81 comprise a scoop 82 which extends beyond the periphery of disk 74 and is adapted to freely pass through a hole 83, provided in the bottom of a chute 31, into the chute and through the nuts contained therein, picking up only one as it passes through opening or slot 33 in hopper 26 and out through said slot. Scoop 82 is provided with a relatively short narrow neck portion 84 (Figure 4) which connects the scoop 82 with a relatively wide supporting body portion 85. Body 85 is provided along its sides adjacent scoop 82 with upstanding side walls 86 which form in conjunction with the body 85 a pocket or the like 87. Pocket 87 is preferably of arcuate shape and is disposed in close proximity to a novel receiving pocket, to be hereinafter described, formed in the gripping and cracking assemblies G. The under side of body member 85 is provided with a pair of lugs or projections 88 which are adapted to snugly receive a portion of the disk 74 therebetween. Lugs 88 and disk 74 are provided with aligned apertures which receive bolts 89 for securing fingers 81 to the disk 74.

It will be appreciated that some method of closing the opening 83 in chute 31 will be necessary in order to prevent the uncracked nuts from passing into the receiving hopper R. In the present embodiment, chute 31 on each side of aperture 83 is provided with blocks 91 (Figure 2) of wood or any other suitable material which is cut at 92 to the shape of the chute 31. The lower faces 93 of blocks 91 are flat and receive supporting hangers 94 thereon. Blocks 91 and hangers 94 are secured to hopper 31 by means of bolts 95 which project through hopper 31, blocks 91, and hangers 94 and receive nuts 96 thereon. A shaft 97 is rotatably supported at its ends in hangers 94 and carries a cylinder or drum 98 thereon. Drum 98 is adapted to rotate about the axes of shaft 97 and is provided with a stop pin 99. One side of drum 98 is recessed at 101 and provides radially extending flat walls 102 and 103 which define an angle of approximately 120° therebetween. The recess 101, when drum 98 is in its assembled position, is biased toward the front of the machine by a spring 104 secured at one end to a lug 105 on drum 98, and at its other end to a lug 106 on hopper 31. In this biased position, stop pin 99 contacts hangers 94 and prevents further rotation of drum 98 and retains spring 104 under tension. When in this position it will be apparent (Figure 2) that the peripheral wall 107 of drum 98 lies over opening 83 in hopper 31 and prevents egress of the nuts from the hopper. In operation of the machine, as viewed in Figure 2, scoops 82 of fingers 81 contact the wall 102 of drum 98 and cause counterclockwise rotation of drum 98 against the force of spring 104. This rotation continues until scoop 82 passes into hopper 31 and out of contact with the wall 102. At this time there is no force opposing spring 104 and as a consequence drum 98 is rapidly rotated in a clockwise direction to close opening 83 before another nut can pass under scoop 82 into the opening. It will thus be seen that a very simple and effective closure gate is provided for the hopper 31.

Notches 79 also receive the gripping and cracking assemblies G which are secured in operative position upon disk 74 by bolt and nut assemblies 108 which pass through aligned apertures in plate 74 and lugs 109. Lugs 109 are integrally formed on supporting members 111 comprising relatively arcuate shaped base members 112 having integrally formed circular ring members 113 at their outer ends. A hollow cylinder 114 is non-rotatably and non-slidably secured within each ring 113 and forms a support and guide for a reciprocable plunger 115.

Plungers 115 are provided adjacent their inner ends with enlarged heads 116 which are provided with conical recesses 117 for receiving a nut to be cracked. The head 116 is preferably smaller in diameter than the main bore 118 of the cylinder 114. An internal annular shoulder 119 is formed in bore 118 and is adapted to slidably receive head 116. Flat rings 121 provided with centrally disposed apertures 122, and adapted to slidably receive plungers 115 which are positioned in bores 118. Coil springs 123 surround plungers 115 and about rings 121 at their inner ends and are received in abutting relation within a recess 124 of a sleeve 125 which is secured to the outer ends of plungers 115 as by pins 126. It will be seen from an inspection of Figure 3 that plungers 115 are normally retained in their extended positions under the influence of springs 123.

Plungers 115 are recessed at 127 to accommodate anti-friction rollers 128 which are adapted to contact with actuators A with a minimum of friction during operation of the machine. In order that the plungers 115 will receive only a reciprocating motion when the actuating mechanism operates to effect gripping and cracking of the nut, a groove 129 is provided in sleeve 125 which is adapted to receive a screw 131 threaded through the cylinder 114. Screws 131 and grooves 129 cooperate in an obvious manner to constrain the plunger 115 to a reciprocable motion.

As previously pointed out the gripping and cracking assemblies G are provided with a novel receiving pocket preferably in the form of a wire basket 135. Basket 135 comprises a plurality of longitudinally disposed spring wires 136 which are adapted to slidably fit within a series of slots 137 provided in heads 116 of plungers 115. Wires 136 are preferably formed from a straight wire which is bent as at 138 into the form of a hook 139. The finished wire 136 as seen in Figure 6 comprises a central body portion 141 and hooked end portions 139. Hooked end portions 139 are adapted to reciprocate within slots 137 and cooperate therewith to prevent rotation of the wires 136 during reciprocation of plungers 115.

Baskets 135 are adapted to cooperate with pockets 87 of pick up fingers 81 as seen in Figure 7. In this figure, the disk 74 with the attached finger 82 and cooperating basket 135 has reached the point where the nut has just fallen from pocket 87 into basket 135. Further rotation of disk 74 brings the gripping and cracking assemblies G into contact with actuators A and causes plungers 15 to approach the nut in basket 135.

Since the baskets 135 are formed of spaced wires, a nut falling from pocket 87 may be tumbled in basket 135 from the time the nut is received therein until the gripping assemblies have been advanced into contact therewith, and as a consequence of the tumbling action the nuts are positioned with their longitudinal axes parallel to the axis of the reciprocating plungers 115. This action is encouraged by the surface grooving of some type of nuts, the grooving tending to align with the wires of the basket as the nut is tumbled. The wire baskets 135 furthermore assure the proper positioning of the smaller sized nuts since the wires 136 will retain the smaller nuts in a position to be received in the enlarged end of the conical gripping surfaces 117 and due to the conical shape of the receiving surfaces, the nuts will slide into the center of the gripping heads 116 as the plungers advance under the influence of actuators A. It will, therefore, be evident that the wire baskets have several important functions. First, by reason of the large diameter required in the nut receiving chambers to accommodate the larger sized nuts, the wires provide a flexible means of bringing the nuts into a central position in line with the center of the plunger sockets and spring back to the walls of the chambers when cracking large round nuts such as English walnuts. When cracking small round nuts, the wires maintain the nuts in a position approximately in a center line with the center of plunger sockets 2 and 3. In cracking odd shapes of nuts such as almonds, pecans and Brazil nuts, the arrangement of the wires is such that the nuts are deposited with their ends approximately in line with the center line of sockets 2 and 3 thereby contacting the nuts on the ends which is essential to a proper cracking action.

*Actuating mechanism for gripping and cracking assemblies*

As previously pointed out, the machine of the present invention is adaptable to all sizes and kinds of nuts without the necessity of manual adjustments or changing of parts. While graded nuts to some extent have eliminated the disadvantages of prior machines in this respect, it has been found with graded nuts now obtainable on the market, there are wide variations in sizes so that prior machines oftentimes require manual adjustment or a change in parts to accommodate nuts of the same grade. As an example, the following table is submitted for which nuts were selected from a single grade.

| Nut No. | Nut diam. | Length of nuts | Thrust required to properly crack each nut |
|---|---|---|---|
| 1 | 5/8″ | 15/16″ | 1/16″ |
| 2 | 5/8″ | 1″ | 5/64″ |
| 3 | 5/8″ | 1 1/16″ | 7/64″ |
| 4 | 5/8″ | 1 1/8″ | 4/32″ |
| 5 | 5/8″ | 1 1/4″ | 9/64″ |

It will be noted that each nut according to its length required a different amount of thrust movement to properly crack it without unduly breaking the meat. Former machines have not been practical in this respect since manual adjustments for each nut are virtually impossible. Accordingly, it was not until the present invention with its automatic pressure and thrust control that the problem in varying nut sizes was solved.

Figure 8:
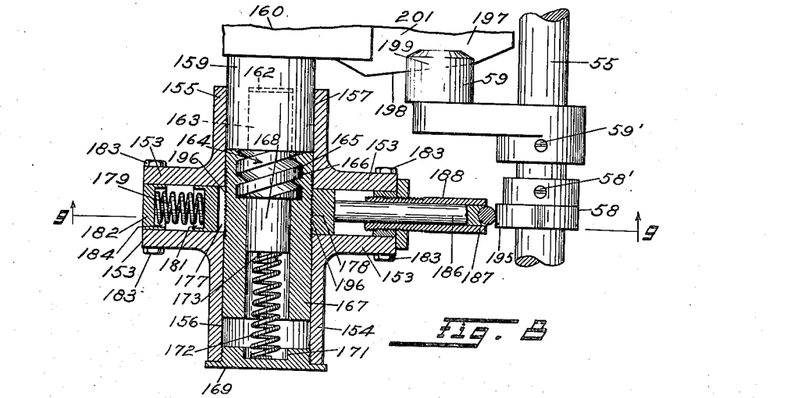
Figure 8 is a plan view of one of the nut locking and cracking mechanisms of the present invention with parts thereof in section in order to show the cooperation of the parts.
Figure 9:
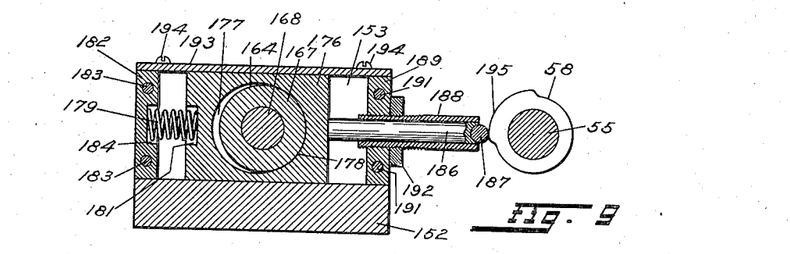
Figure 9 is a sectional view taken substantially on the line 9—9 of Figure 8 when viewed in the direction indicated by the arrows.

Passing to a description of the mechanism by which such control is maintained, the actuating assemblies A are supported on plate 45 adjacent the front of the machine and are approximately diametrically disposed with relation to the point at which the nuts are picked up by fingers 81. The actuating mechanisms are preferably supported on bases 149 which are secured to plate 45 by means of bolts 151. Bases 149 (Figures 8 and 9) comprise a flat relatively broad pillow pieces 152 and upright spaced rectangularly shaped walls 153 having oppositely extending bosses 154 and 155 formed thereon. Bosses 154 and 155 are provided with aligned bores 156 and 157 which are adapted to receive the movable parts of the actuating assemblies which will now be described.

An annular stub shaft 159 is rotatably supported in bore 157 and carries a cam lever 160 having a curved extension or cam 161 which is adapted to contact the ends of plungers 115 upon this initial contact with the actuators A. Shaft 159 is further provided with a bore 162 into which an extension 163 of a connecter member 164 is preferably fitted or driven to provide a nonrotatable connection. If desired, extension 163 may be non-rotatably secured in bore 162 by means of a key or other suitable means. Connecter 164 is provided with an enlarged portion 165 preferably provided with double square threads which are threaded in a bore 166 of a sleeve 167. Sleeve 167 is slidably received in bores 156 and 157 for a purpose to be hereinafter described, and is threaded or grooved throughout a portion of its length. An extension 168 integrally formed on connecter 164, is adapted to loosely fit within the portion of bore 166.

Figure 11:
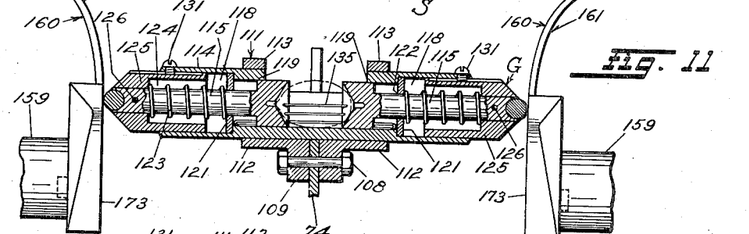
Figure 11 is a sectional view through a set of gripping and cracking plungers showing them in the position they assume when gripping a nut.

The outer end of bore 156 is threaded to receive a closure plug or cap 169 having an annular recess 171 therein. A coil spring 172 of slightly greater strength than springs 123 is positioned within bore 166 of sleeve 167 and is held under slight compression in abutting relation with the end of extension 168 and cap 169 by a centrally disposed lug 173 on extension 168 and a central recess 171 in cap 169. Spring 172 is adapted to move the sleeve 167, connecter 164, stub shaft 159 and the associated lever 160 as a unit to their outermost or normal position where the lever 160 through cam 161 will be in the path of the ends of the plungers 115 as disk 74 is rotated. As the plungers 115 come into contact with the cam 161 of lever 160, the plungers 115 will be moved inwardly toward the nut against the resistance of springs 123 since the springs 172 are slightly stronger than springs 123. After the nut is contacted by heads 116 as shown in Figure 11, lever 160, stub shaft 159, connecter 164 and sleeve 167 are forced back against the resistance of springs 172 into bores 156 and 157 of support 149. This movement is due to the inability of the springs 172 to exert sufficient force to crack the shell of the nut. This movement of the actuating mechanism continues until plungers 115 reach the vertical face 173 of lever 160 at which time the cam 58 has been rotated sufficiently to cause the locking of sleeve 167 and its associated parts in the position they have attained due to the gripping of the nut, and in a manner to be hereinafter described.

From a consideration of the preceding description, it will be apparent that the above mentioned position of sleeve 167 and its associated parts will depend entirely upon the size of the nut in the basket 135 since the movement of sleeve 167 does not start until plungers 115 have contacted the nut. This being true it will be readily perceived that if a small nut has been picked up by the machine very little movement of sleeve 167 will take place whereas if a large nut is picked up a relatively great movement of sleeve 167 will result.

Locking of sleeve 167 is effected by the following elements which are slidably disposed between the upright walls 153 of support 149 and are adapted to be moved into contact with the sleeve 167. The locking assembly comprises a block 176 having an opening 177 in alignment with and of sufficient size to freely surround the outer surface of sleeve 167. The opening 177 is sufficiently large to provide an appreciable clearance around sleeve 167 and is provided with a knurled or threaded portion 178 which extends throughout about one-half of its periphery and is positioned opposite a like knurled or threaded portion on sleeve 167. When the sleeve 167 is being moved longitudinally within bores 156 and 157, block 176 is disposed in approximately concentric relation with respect to sleeve 167 by a coil spring 179 which is received in a recess 181 in block 176 and abuts a removable closure member 182 which is secured between walls 153 and held in place therein by bolts 183. Member 182 is provided with a recess 184 in alignment with recess 181 and cooperates therewith to retain spring 179 which is assembled under slight compression in operative position between walls 153.

Block 176 at the side opposite to that upon which recess 181 is formed is provided with an arm 186 which is preferably integrally secured at the center of block 176. Arm 186 is provided at its outer end with an antifriction roller 187 secured in the end thereof which is adapted to follow cam 58 carried by shaft 55. Coil spring 179 is adapted to hold roller 187 in contact with cam 58 as well as to maintain the concentric relation of sleeve 167 and block 176 so long as the low portion of cam 58 contacts roller 187. Arm 186 is preferably supported in and guided by a sleeve 188 which is threaded into an apertured supporting member 189 which is secured between walls 153 by means of bolts 191. A lock nut 192 is threaded on sleeve 188 and retains the sleeve in adjusted position. The space between walls 153 is completely closed against the entry of dust and foreign matter by a removable cover 193 which is secured to walls 153 as by machine screws 194.

The locking mechanism functions in the following manner to lock the sleeve 167 and its associated parts. Assuming that sleeve 167 has been moved to its ultimate locking position by lever 161 and plungers 115 due to the resistance of the nut in basket 135, the high part 195 of cam 58 comes into contact with roller 187 and moves arm 186 and block 176 inwardly against the force exerted by spring 179 until the threaded portion 178 of block 176 contacts the external threads 196 formed on the outer surface of sleeve 167. The engagement of these threads will prevent further longitudinal movement of sleeve 167 so long as high portion 195 of cam 58 is in engagement with roller 187. As seen from Figure 9, this engagement will exist throughout approximately 120° of rotation of shaft 55. During this period the cracking impulse is imparted to plungers 115 by the following mechanism.

Lever 161 is provided adjacent its lower edge with a relatively flat extended arm 197 which is provided with a slanting edge 198. Lever or arm 59 secured to shaft 55 is so disposed in predetermined angular relation with respect to cam 58 that roller 199 will engage the upper flat face 201 of extension 197 just after cam 58 has locked sleeve 167. Since arm 59 is rotated in a counterclockwise direction when viewed from the right of Figure 1 by shaft 55, the engagement of roller 199 and face 201 will impart a clockwise rotational movement to lever 161 and connecter 164 and thereby cause a rapid longitudinal movement of the connecter 164 within the sleeve 167 due to its threaded engagement with bore 166 of sleeve 167. This longitudinal movement of lever 161 causes a like movement of plungers 115 and consequent cracking of the nut.

Figure 12:
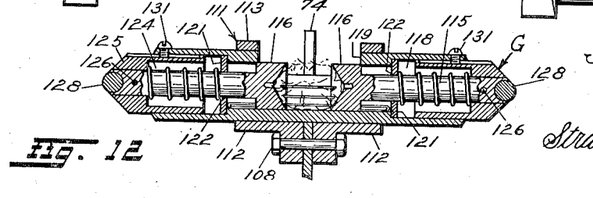
Figure 12 is a view similar to Figure 11 but showing the position of the plungers after they have been forced together to crack a nut.

Figure 11 of the drawings illustrates the position of plungers 115 after the nut has been gripped and the sleeve 167 locked in cracking position. Figure 12 illustrates the position of plungers 115 after the cracking plungers have reached their extreme inner limits. From a comparison of these two figures it will be apparent that the movement of each plunger 115 under influence of threads 165 is relatively small but due to the fact that both plungers are moved inwardly the same distance under a positive force, a sufficient movement to crack the nut is obtained.

As previously pointed out the length of the cracking or thrust stroke will be automatically determined by the size of the nut to be cracked. This operation will be clear from a consideration of Figures 1 and 8 of the drawings. From the preceding description and the above mentioned figures of the drawings it will be apparent that the longitudinal movement of lever 161, shaft 162, and sleeve 167 will determine how much of the face 201 of extension 197 will be disposed in the path of rollers 199. Since the rotation of lever 161 will depend entirely upon the length of time that rollers 199 contact faces 201, it will be seen that due to the slanting face 198 of extension 197 the rollers will pass off of face 201 sooner if the lever 161 is moved toward support 149 only a short distance than if lever 161 is moved to a relatively great distance. From a consideration of the various views it will be apparent that at no time will the lever 161 be given more than approximately one-quarter of a turn therefore there will be no danger of connecter 164 advancing to such an extent that threads 165 will become disengaged. It will be noted that the actual cracking stroke involves a thrust movement as contrasted to a hammer stroke. The result is a gradual application of pressure, properly and automatically regulated and halted at the right point for each size nut, depending upon the dimensions thereof. This feature of varying the stroke, pressure or thrust in proportion to the length of the nut has never before been recognized by the workers in this field and has been found virtually necessary to obtain the best results even in the case of graded nuts having variations in length of only one-sixteenth of an inch.

A coil spring 203 is secured at one end to an arm 204 integrally formed on lever 161 and at its other end at 205 to the angle bar 44 at the front of the housing which encloses the working parts of the machine. Spring 203 is of the contacting type and functions to return lever 161 to its normal position with respect to sleeve 167 after roller 199 has passed off of face 201.

In order that the operating mechanism may not be subjected to undesirable stresses which might cause breakage of a part of the machine if fingers 81 fail to pick up a nut the parts are so proportioned and constructed that the heads 116 of plungers 115 will be just touching or slightly spaced from each other under such conditions. When plungers 115 assume this position, sleeve 167 will be locked in its extreme outer position by block 176 and the rollers 199 will just miss the face 201 of extension 197 as seen in Figure 1 so that no cracking impulse will result from the rotation of arm 59. This safety feature is of primary importance since it prevents the undesirable action of one plunger abutting another.

It will be noted that the spring behind the cracking plunger and the springs behind the cracking nut and curved plate act in unison to establish the proper preliminary pressure on the nut prior to cracking. Investigation has disclosed that this pressure should not be uniform for every size nut as has been heretofore contemplated but should be varied depending on the length of the nut being cracked, a greater preliminary pressure being preferred for the larger nuts.

*Modification of the actuator assembly locking mechanism*

In Figures 13 to 17 there is shown a further preferred form of locking mechanism which operates in substantially the same manner as that previously described. The present modification makes use of certain of the same parts and such parts will be designated by the same reference numerals. A slightly modified base or support 210 having upstanding parallel walls 211 and 212 is secured to plate 45 by suitable bolts 151. Walls 211 and 212 define a passageway 213 which passes diagonally from the outer side of the forwardly disposed edge 214 of the enlarged body section 215 to the inner side of the rearwardly disposed edge 216.

Body section 215 is provided with bosses 154 and 155 identical in construction with bosses 154 and 155 of the previously described actuator mechanisms. Bosses 154 and 155 have aligned bores 156 and 157 which slidably receive a solid shaft 217 which is cut out at 218 adjacent passage 213 to a depth approximately equal to one-half of its diameter. The section 219 of reduced diameter formed by cut 218 embodies a flat surface 220 which is provided with transverse serrations 221 for a purpose that will presently appear. The ends of passage 213 are closed by removable closures 182a and 189a.

Shaft 217 is provided with a recess 223 and threads 224 which are adapted to rotatably receive end 168 and threads 165 of a connecter 164a similar in construction and operation to that previously described. The other end of shaft 217 is recessed at 225 to receive coil spring 172. From the above description it will be clear that shaft 217, connecter 164a and spring 172 function in exactly the same manner as members 164, 167 and 172 of Figures 1 to 12.

Figure 17:
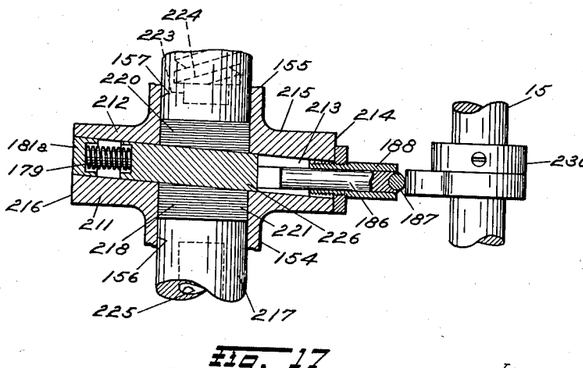
Figure 17 is a section of a further preferred modification of the device of Figure 8 wherein the locking means is designed to operate at an angle to the shaft to be locked.

The novel stop mechanism which is adapted to cooperate with shaft 217 to lock the same against longitudinal movement when a nut has been gripped by plungers 115 comprises a rectangular block 226 having slanting ears or rails 227 which are adapted to slide in guideways 228 formed in walls 212 of base 210. The under surface of block 226 is provided with serrations 229 which are adapted to cooperate with serrations 221 on shaft 217 when the block 226 is moved along guides 228 under influence of a cam 230 carried on shaft 15. The teeth in block 226 are preferably milled at an angle to the sides of the block corresponding to the angle of travel of the block in the housing as shown in Figure 17 thus bringing the teeth in alignment across the center line of shaft 217 to provide for a slight end movement of shaft 217 eliminating any loose motion that might occur in the various parts and movements of the locking and cracking mechanism.

The passage 213 is closed at the top by a cover plate 231 having downwardly extending guide rails 232 which contact at the sides of an upstanding centrally disposed tongue 233 formed on the top of block 226. Plate 231 is secured to walls 211 and 212 by suitable bolts 194. Closure member 189a is apertured at 234 to screw threadedly receive sleeve 188 in a manner previously described with reference to the first preferred locking mechanism. Sleeve 188 slidably receives arm 186 which abuts block 226 at one end and cam 230 at the other end. Block 226 is held in contact with the arm 186 and the latter in contact with cam 230 by spring 179 in a manner previously described.

Figures 13, 14:
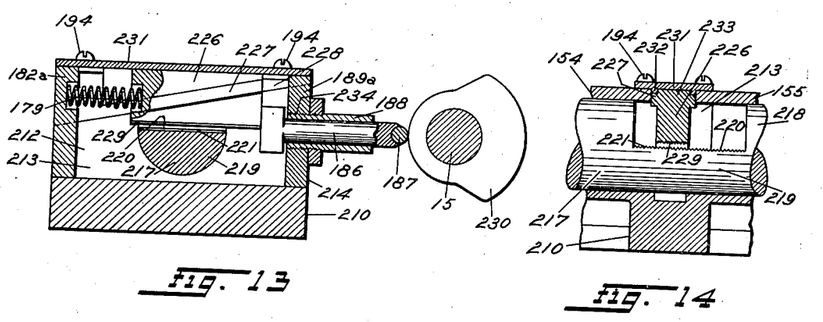
Figure 13 is a section of preferred modified form of a nut locking and cracking mechanism such as is shown in Figures 8 and 9 with parts thereof in section to more clearly illustrate the cooperation of the parts.
Figure 14 is a side view taken partially in section of the mechanism of Figure 13.
Figure 15:
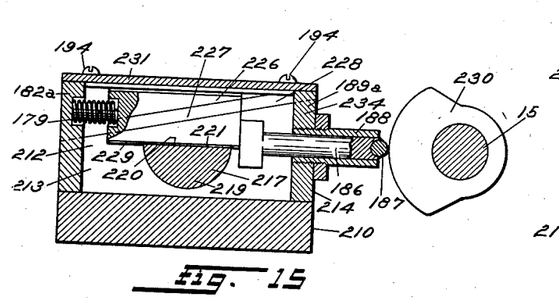
Figure 15 is a section of a further preferred form of nut locking and cracking mechanism.
Figure 16:
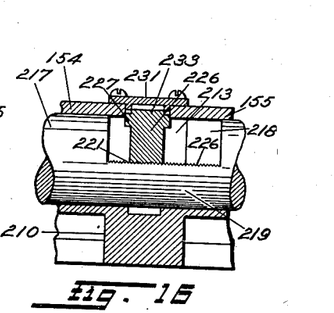
Figure 16 is a side view taken partially in section of the device of Figure 15.

In the present modification, as the cam 230 rotates, the arm 186 and block 226 will be moved from the position shown in Figures 13 and 14 to the position shown in Figures 15 and 16 against the resistance offered by spring 179. As this movement occurs, block 226, due to the sloping ears 227 and guideways 228 will be moved downwardly and serrations 221 and 229 will be engaged to prevent further longitudinal movement of members 217, 164 and 172. Upon the completion of the cracking stroke the members 186 and 226 will return to the position shown in Figures 13 and 14 under influence of springs 179. It will thus be seen that a further effective and simple lock is provided for locking the actuators A. The remaining operations of the machine are the same as that described in connection with Figures 1 to 12, inclusive.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. A nut cracking machine comprising a driving shaft; a driven shaft; a member mounted on said driven shaft for rotation relative thereto and having means thereon to convey and grip nuts for cracking; and means interconnecting said driven shaft and said member in driving relation whereby said member rotates at a lower rate of speed than said driven shaft.

2. In a nut cracking mechanism, oppositely disposed plungers arranged to grip a nut to be cracked, said plungers having opposed apertures therein; and flexible members interconnecting said plungers and freely mounted in and extending through said apertures and arranged to position said nut for cracking.

3. In a nut cracking mechanism, a hopper arranged to contain a supply of nuts; means associated with said hopper to individually remove nuts therefrom; a plurality of movable plungers carried by said means and arranged to contact nuts for gripping and cracking; means to engage said plungers to effect gripping of the nuts; means to arrest the action of said last-mentioned means in accordance with the size of the nut to be cracked and means to actuate said plungers to effect cracking of said nuts, said latter means being arranged with reference to said grip actuating means whereby the extent of action of said latter means is dependent on the position of said grip actuating means whereby individual nuts of differing sizes may be cracked in a manner to preserve the kernels in commercial condition.

4. In a nut cracking mechanism, a plurality of gripping and cracking members, a series of cams having sloping faces thereon arranged to engage said members; an extension on each of said cams; an actuator arranged to engage said extension to impart rotation to said cam; and means associated with said cams for positioning the same with respect to said actuators whereby the period of engagement of the latter with said extensions is automatically determined by the size of the nut being cracked.

5. In a nut cracking mechanism, a nut carrying member comprising gripping and cracking plungers; actuating means for said plungers comprising cams arranged to follow said plungers in accordance with the movement of said nut carrying member; extensions on said cams; a hollow threaded sleeve disposed in aligned relation with said extension, said extension and said sleeve being connected through a quick action screw thread connection; a casing for said sleeve arranged to permit relative longitudinal movement of said sleeve, extension and cam; resilient means arranged to resist said movement in one direction; means operable at predetermined intervals to arrest said movement; and means operable subsequent to the operation of said last-mentioned means to impart rotational movement to said cam and extension whereby they are advanced to actuate said plungers and crack the nut therein.

6. In a nut cracking machine of the individual pick-up type, a set of reciprocable and opposed gripping and cracking elements comprising a protective casing and guide for each of said elements; relatively large gripping heads carried on the inner end of each element; a relatively enlarged and movable sleeve having an internal recess secured to the outer ends of each element; a resilient member disposed in said recess and abutting said sleeve at one end; means secured to said casing to provide an abutment for the opposite end of said spring; and means for retaining said sleeve in operative position within said casing.

7. A nut cracking machine comprising oppositely disposed plungers arranged to grip a nut to be cracked, said plungers having opposed apertures therein; and flexible members supported in said opposed apertures and rotatable with said plungers to form a pocket for the nut to be cracked.

8. In a nut cracking mechanism, a source of supply of nuts to be cracked; means to selectively remove individual nuts from said source of supply; receiving pockets arranged adjacent said means to receive nuts therefrom and position them for cracking; and opposed cracking plungers rotatable with said means and said pockets designed to crack said nuts, said pockets including a false bottom comprising elongated, flexible elements freely supported by the inner ends of said plungers and designed to automatically position a nut in a manner whereby its longest dimension is approximately parallel to the longitudinal axes of said elements, the latter being arranged to yield to permit said nuts to be substantially centered in relation to the line of application of the cracking force.

9. In a nut cracking mechanism, a hopper to contain a supply of nuts; means associated with said hopper to individually remove nuts therefrom; a plurality of movable plungers carried by said means and arranged to contact nuts for gripping and cracking; means to engage said plungers to effect gripping of the nuts; means to arrest the action of said last mentioned means in accordance with the size of the nut to be cracked and means to actuate said plungers to effect cracking of said nuts, said latter means comprising a quick action screw thread connection arranged with respect to said grip actuating means to cause it to be actuated in synchronism with said nut removing means and to render the extent of action of said latter means dependent on the position of said grip actuating means whereby individual nuts of differing sizes may be cracked in a manner to preserve the kernels in commercial condition.

10. A nut cracking machine comprising a supply bin; means to select and convey individual nuts from said supply bin; a rotatable shaft arranged to operatively support said means for rotation thereover; means carried by said first mentioned means to receive and grip said nuts supplied by said selecting and conveying means; means to actuate said gripping means to effect cracking of said nuts; and means carried by said shaft and rotatable therewith to operate said actuating means.

11. A nut cracking mechanism comprising a rotary disk, a driving shaft, a driven shaft to support said disk, means on said disk to grip a nut to be cracked, means for causing said gripping means to exert a gripping force on said nut in accordance with the size thereof as said disk rotates, and means to arrest the gripping force of said last-mentioned means at the point of maximum force, said arresting means comprising an extension on the means for controlling the pressure of said gripping means, a member for engaging and retaining said extension in fixed relation and means on said shaft for effecting locking engagement of said extension and said member.

12. A nut cracking machine comprising a driving shaft; a source of power connected to said driving shaft; a driven shaft designed to be driven at substantially the same speed as said driving shaft; a source of nuts; means rotatably mounted on said driven shaft and designed to select and remove individual nuts from said source; means for actuating said last mentioned means; means for gripping said selected nuts; means for actuating said gripping means to effect a gripping force in accordance with the size of the nut selected; means for arresting operation of said actuating means in accordance with the size of the nut selected; means on said driven shaft for operating said arresting means; and means carried on said driven shaft for engagement with a portion of said actuating means for imparting a quick thrust to said gripping means of a length determined by the position of said actuating means to cause said nuts to be cracked.

13. In a nut cracking machine, a set of movable cracking elements; means for supplying nuts thereto; movable actuating means including yieldable elements causing initial gripping of said nuts by said cracking elements disposed in the path of movement of said cracking elements for engagement thereby; and means operable in accordance with the size of the nut being cracked for regulating the distance through which said actuating means moves after the nut has been gripped.

JEROME F. KIDD.